US008203584B2

(12) United States Patent
Struble et al.

(10) Patent No.: US 8,203,584 B2
(45) Date of Patent: Jun. 19, 2012

(54) PROCESSOR FOR IMAGING MEDIA

(75) Inventors: Kent R. Struble, Woodbury, MN (US); David J. McDaniel, Vdnais Heights, MN (US); Duane A. Preszler, River Falls, WI (US); Paul Stelzig, Ham Lake, MN (US)

(73) Assignee: Carestream Health, Inc., Rochester, NY (US)

(*) Notice: Subject to any disclaimer, the term of this patent is extended or adjusted under 35 U.S.C. 154(b) by 0 days.

(21) Appl. No.: 13/069,755

(22) Filed: Mar. 23, 2011

(65) Prior Publication Data

US 2011/0187808 A1 Aug. 4, 2011

Related U.S. Application Data

(62) Division of application No. 11/500,227, filed on Aug. 7, 2006, now Pat. No. 7,924,300.

(51) Int. Cl.
*G05D 23/00* (2006.01)

(52) U.S. Cl. ........ 347/223; 347/171; 347/194; 347/212; 430/350

(58) Field of Classification Search .................. 430/350; 347/223, 171, 194, 212
See application file for complete search history.

(56) References Cited

U.S. PATENT DOCUMENTS

| | | | |
|---|---|---|---|
| 5,212,528 | A | 5/1993 | Matsuda |
| 5,502,533 | A | 3/1996 | Biegler |
| 5,849,388 | A | 12/1998 | Preszler et al. |
| 5,920,961 | A | 7/1999 | Hollingsworth |
| 5,983,993 | A | 11/1999 | Watson et al. |
| 6,041,516 | A | 3/2000 | Preszler et al. |
| 6,051,813 | A | 4/2000 | Struble |
| 6,146,028 | A | 11/2000 | Preszler |
| 6,320,642 | B1 | 11/2001 | Ogawa et al. |
| 6,531,268 | B1 | 3/2003 | Hirabayashi |
| 6,909,448 | B2 | 6/2005 | Torisawa |
| 7,158,164 | B2 | 1/2007 | Okada |
| 7,399,947 | B2 | 7/2008 | Rassatt et al. |
| 7,510,596 | B2 | 3/2009 | Struble et al. |
| 2003/0147665 | A1 | 8/2003 | Ahn et al. |
| 2003/0194638 | A1 | 10/2003 | Goto et al. |
| 2005/0068410 | A1 | 3/2005 | Kama |
| 2006/0003272 | A1 | 1/2006 | Yanagisawa |
| 2006/0181599 | A1 | 8/2006 | Okada |

FOREIGN PATENT DOCUMENTS

| | | |
|---|---|---|
| WO | WO 93/00613 | 1/1993 |
| WO | WO 97/13182 | 4/1997 |
| WO | WO 97/20253 | 6/1997 |
| WO | WO 97/28487 | 8/1997 |

OTHER PUBLICATIONS

International Search Report for corresponding PCT/US07/17428, dated Dec. 21, 2007.

*Primary Examiner* — Amanda C. Walke

(57) ABSTRACT

A thermal processor including an oven and a cooling section. The oven is configured to heat an imaging media to a development temperature. The cooling section is configured to cool the imaging media from the development temperature to a desired exit temperature as imaging media moves along a transport path from an entrance to an exit. The cooling section provides a varying rate of heat transfer from the imaging media along the transport path so as to create a varying cooling temperature gradient in the imaging media substantially equal to and not exceeding a varying maximum cooling temperature gradient of imaging media.

14 Claims, 8 Drawing Sheets

PROCESSOR FOR IMAGING MEDIA

CROSS REFERENCE TO RELATED APPLICATIONS

This is a Divisional of U.S. Ser. No. 11/500,227 entitled "PROCESSOR FOR IMAGING MEDIA", filed on Aug. 7, 2006, by Struble et al., which issued as U.S. Pat. No. 7,924, 300.

FIELD OF THE INVENTION

The present invention relates generally to an apparatus and method for processing photothermographic film, and more specifically an apparatus and method for thermally developing an imaging material employing a cooling section with varying heat transfer characteristics.

BACKGROUND OF THE INVENTION

Photothermographic film typically includes a base material, such as a polymer, coated on at least one side with an emulsion of heat sensitive materials. After the film has been imaged (i.e., subjected to photo-stimulation), the resulting latent image is developed through application of heat to the film so as to heat the film to a prescribed temperature for a prescribed time. This relationship between time and temperature is critical to achieving a high quality image.

As such, controlling heat transfer to the film during the development process is crucial. If heat transfer is not uniform during development, visual artifacts, such as non-uniform density and streaking, may occur. If heat is transferred too rapidly, the base material of some films may expand too quickly resulting in expansion wrinkles that can cause visual and physical artifacts in the developed film.

Likewise, once the film has been heated to make the latent image visible, it is important to cool the film in order to prevent overdevelopment of the image. In the same way it is critical to control the heating process, it is also important to control the cooling of the film. If the chemical reaction of the emulsion (i.e., image development) is not stopped in a uniform fashion, non-uniform density and streaking may occur. If the film is cooled too rapidly, the base material may contract too quickly resulting in contraction wrinkles that can cause visual and physical artifacts in the developed film.

Various cooling techniques have been developed and employed by thermal processors for cooling photothermographic film. One technique employs a cooling plate, wherein heat is transferred from the heated film to the cooling plate, which is cool relative to the film, by sliding the film across the plate. As "throughput" requirements of processors have increased, active cooling has been added by blowing air across the side of the plate opposite the side contacting the film to remove heat from the cooling plate to enable the film to be cooled more quickly.

While such a technique is effective at cooling the imaging media, sliding the film on the fixed cooling plate may scratch the emulsion, which is still soft from the elevated processing temperature. Additionally, a further increase in the throughput requires an increase in size (where space is typically limited) or an increase in the rate of cooling, which may result in wrinkling of the base material of the imaging media.

In light of the above, as the throughput requirements of processors continue to increase while the size of processors continue to decrease, it is evident that there is a need for a compact cooling section providing increased throughput while maintaining a high level of image quality.

SUMMARY OF THE INVENTION

In one embodiment, the present invention provides a thermal processor including an oven configured to heat an imaging media to a development temperature and a cooling section. The cooling section is configured to cool the imaging media from the development temperature to a desired exit temperature as the imaging media moves along a transport path from an entrance to an exit, wherein the cooling section is configured to provide a varying rate of heat transfer from the imaging media along the transport path so as to create a varying cooling temperature gradient in the imaging media substantially equal to and not exceeding a varying maximum cooling temperature gradient of the imaging media.

In an embodiment, a thermal conductivity of the cooling section increases along the transport path from the entrance to the exit to vary the heat transfer rate.

In an embodiment, the cooling section is configured to provide a temperature level which decreases along the transport path from the entrance to the exit to vary the heat transfer rate.

By varying the heat transfer rate along the transport path as the temperature of the imaging media decreases so as to substantially match the cooling temperature gradient of the imaging to a maximum cooling temperature gradient, the cooling section is able to substantially minimize a time necessary to cool the imaging media from a development temperature to a desired exit temperature without introducing visual and physical artifacts resulting from wrinkling.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION OF THE INVENTION

Figure 1:
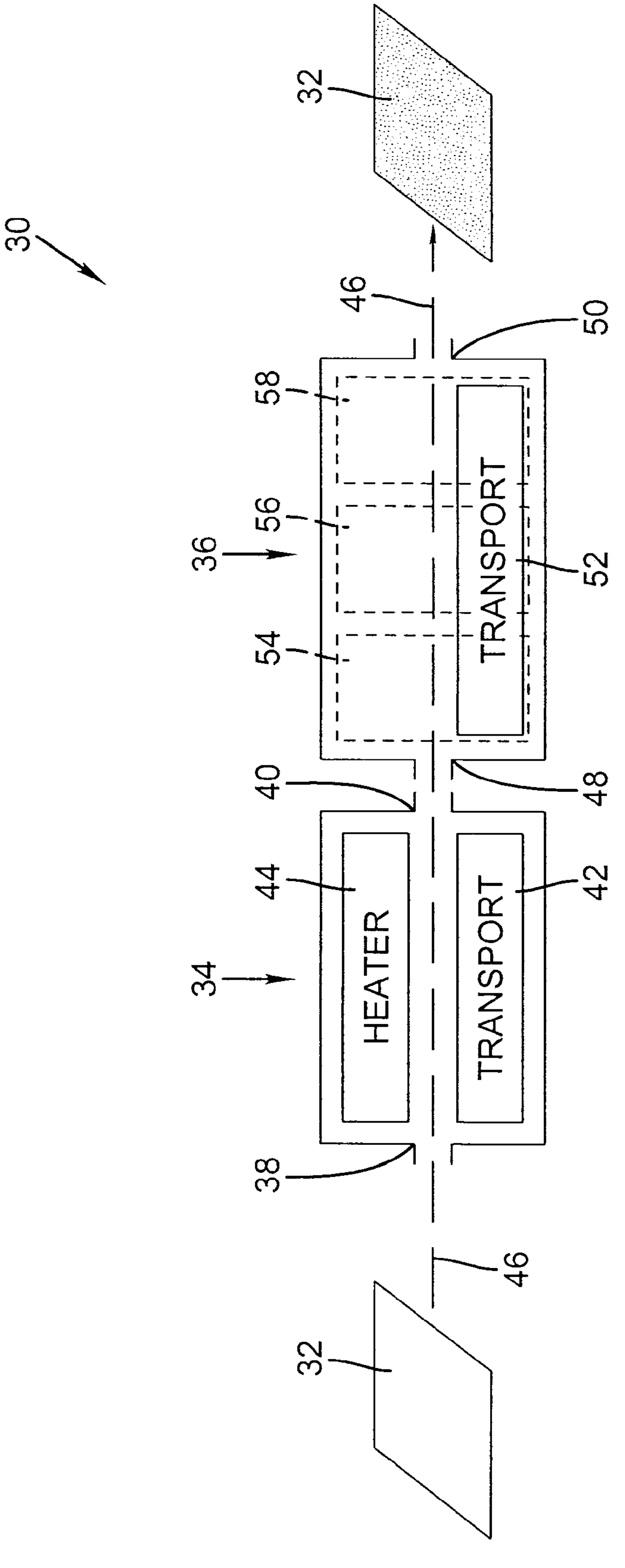
FIG. 1 is a block diagram illustrating generally one embodiment of the thermal processor employing a cooling section according to the present invention.

FIG. 1 is a block diagram illustrating generally one embodiment of a thermal processor 30 according to the present invention for developing an image in an imaging media 32. Thermal processor 30 includes an oven 34 and a cooling section 36 in accordance with the present invention.

Oven 34 includes an entrance 38, an exit 40, a transport system 42, and a heating system 44. Oven 34 receives imaging media 32 at an ambient temperature at entrance 38 and heats imaging media 32 to a development temperature as transport system 42 transports imaging media 32 along a transport path 46 from entrance 38 to exit 40.

Cooling section 36 includes an entrance 48, an exit 50, and a transport system 52. Cooling section 36 receives imaging 32 substantially at the development temperature at entrance 48 and cools the imaging media from the development temperature to a desired exit temperature as transport system 52 transports imaging media 32 from entrance 48 to exit 50 along transport path 46.

Unless compensated for, a temperature difference between imaging media 32 and cooling section 36 will decrease as imaging media 32 moves along transport path 46, resulting in a decrease in a rate of cooling of imaging media 32 as it moves from entrance 48 to exit 50.

In accordance with one embodiment of the present invention, cooling section 36 is configured such that a heat transfer rate of heat from imaging media 32 to cooling section 36 varies along transport path 46 from entrance 48 to exit 50. In one embodiment, as will be described in greater detail below, a thermal conductivity of cooling section 36 increases from entrance 48 to exit 50 so as to vary the heat transfer rate of cooling section 36 along transport path 46. In one embodiment, as illustrated by FIG. 1, cooling section 36 includes a first zone 54, a second zone 56, and a third zone 58, where a thermal conductivity of second zone 56 is greater than a thermal conductivity of first zone 54 and less than a thermal conductivity of third zone 58. Alternately, in one embodiment, as described in greater detail below with regard to FIG. 8, a temperature of cooling section 36 decreases from entrance 48 to exit 50 so as to vary the heat transfer rate of cooling section 36.

It is noted, as mentioned above, if imaging media 32 is cooled too rapidly as it moves along transport path 46, a base material of imaging media 32 may contract too quickly and cause wrinkling in the base material resulting in visual (e.g., density variations) and physical artifacts (e.g., wrinkles) in the developed media.

Figure 2:
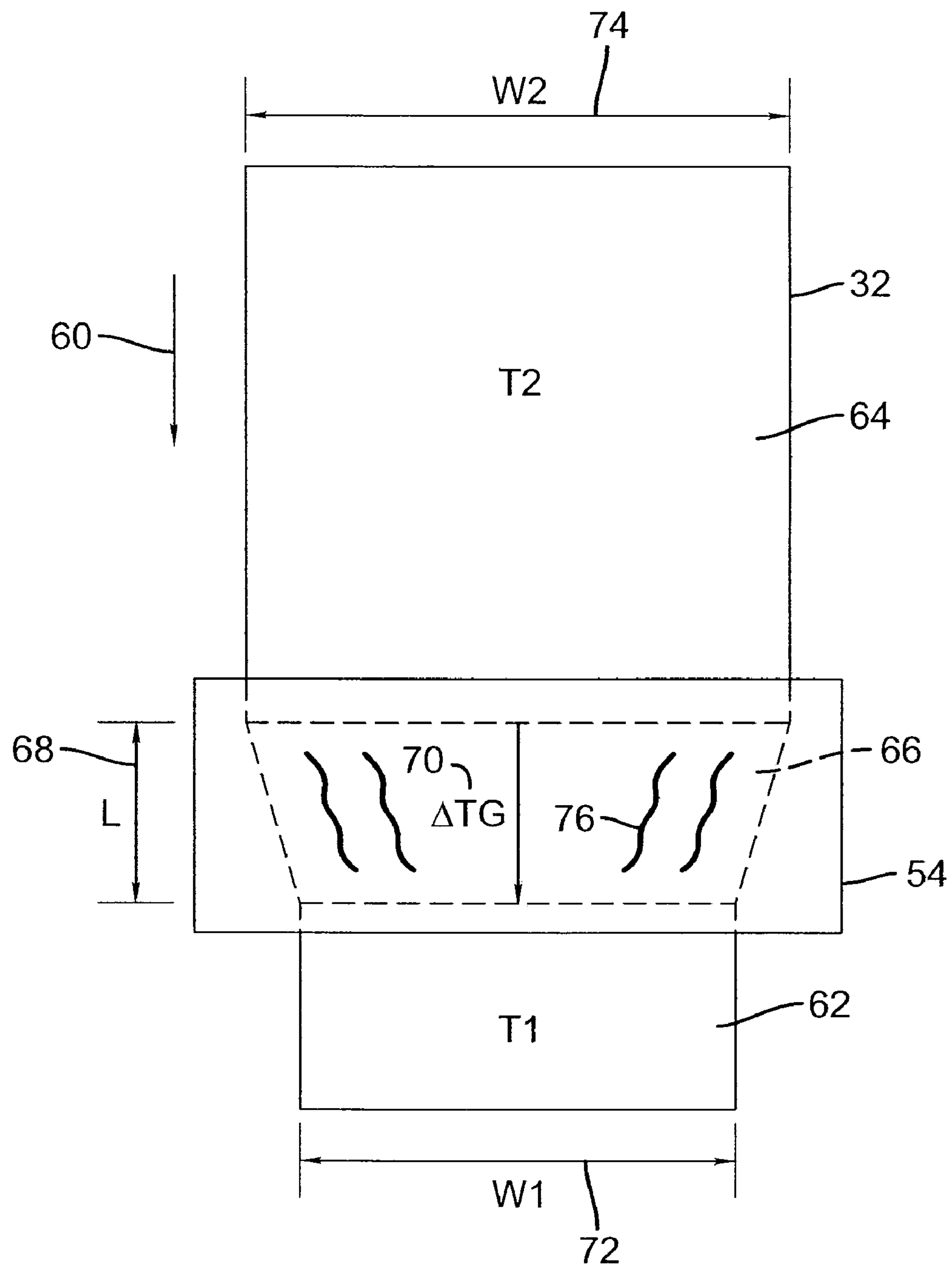
FIG. 2 is an illustration generally representing the cooling of a sheet of imaging media.

FIG. 2 illustrates generally a sheet of imaging media, such as imaging media 32, being cooled, such as by first zone 54 of cooling section 36. As transport system 52 moves heated imaging media 32 through first zone 54, as indicated by directional arrow 60, imaging media 32 is cooled such that a leading portion 62 is at a cooler temperature, T1, relative to a trailing portion 64, which is at a heated temperature, T2 (e.g., the development temperature). As such, a transition portion 66 of imaging media 32 being cooled by first zone 54 has a temperature difference of T2 minus T1 across a corresponding length (L) 68. This temperature difference divided by L 68 represents a cooling temperature gradient ($T_{GRD}$) 70 across transition portion 66 of imaging media 32.

Polymer materials, including the polymer base material of some types of imaging media, such as imaging media 32, have a glass transition temperature, Tg. As generally known, the glass transition temperature represents the approximate midpoint of a typically narrow temperature range over which a rapid change in viscosity of the polymer occurs. Above its glass transition temperature, the polymer (e.g., the base material) is in an amorphous state where it is rubbery in nature, while below its glass transition temperature the polymer is in a more crystalline or glassy state where it is more rigid in nature. While in the glass transition temperature range, the polymer is transitioning from a more amorphous state to a more crystalline state.

As illustrated by FIG. 2, as imaging media 32 is cooled, the polymer base materials contracts such that the cooler leading portion 62 has a width (W1) 72 which is narrower than a width (W2) 74 of the warmer trailing portion 64. For illustrative purposes, the contraction of imaging media 32 as shown by FIG. 2 is exaggerated. In one embodiment, the development temperature is greater than Tg of imaging media 32 and the desired exit temperature is below Tg.

If first zone 54 transfers (i.e., absorbs) heat from imaging media 32 at too high of a rate such that cooling temperature gradient ($T_{GRD}$) 70 is greater than a maximum cooling temperature gradient ($T_{GRD}^{max}$) associated with the base material when the base material is above its glass transition temperature (i.e., T2>Tg), the base material may form wrinkles (as indicated by the "wrinkle" lines at 76) as it contracts from width W2 74 to width W1 72.

If temperature T1 of leading portion 62 remains above Tg of imaging media 32, and at a temperature where a chemical reaction in the emulsion is continuing at a substantial rate, such wrinkles may cause uneven cooling of the emulsion and produce visual artifacts in the developed image in the form of uneven image densities (e.g. streaking). If temperature T1 of leading portion 62 is below Tg of imaging media 32, in addition to the above described visual artifacts, physical artifacts may also be produced as the wrinkles may become "frozen" or fixed into the developed imaging media when the imaging media transitions from the amorphous to a more crystalline state.

To avoid causing such wrinkles, the rate of heat transfer of first zone 54 may be such that $T_{GRD}$ 70 does not exceed $T_{GRD}^{max}$ associated with the base material when the base material is above its Tg (i.e., T2>Tg). However, the further the level of $T_{GRD}$ 70 is below $T_{GRD}^{max}$ (see FIG. 3 below), the greater the time required to cool imaging media 32 from the development temperature to the desired exit temperature and the greater the space required for cooling section 36.

Figure 3:
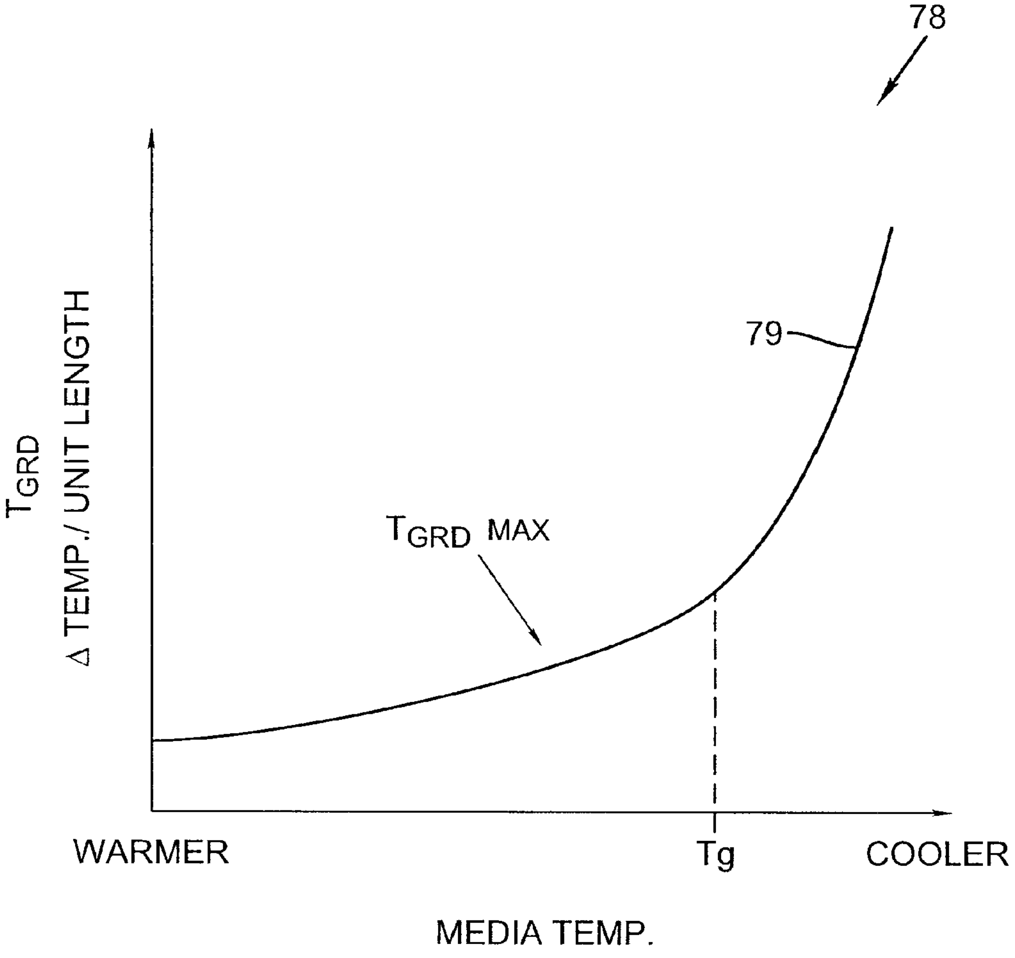
FIG. 3 is a graph illustrative example of a maximum cooling temperature gradient curve.

It is noted that $T_{GRD}^{max}$ of imaging media 32 increases in a non-linear fashion as the temperature of imaging media 32 decreases. In other words, imaging media 32 can be cooled at an increasingly higher rate as its temperature drops. FIG. 3 is a graph 78 of a curve 79 illustrating generally an example of the non-linearity of $T_{GRD}^{max}$. As illustrated, a temperature of imaging media 32 decreases from left-to-right along the x-axis, with $T_{GRD}$ increasing vertically along the y-axis. Note that $T_{GRD}^{max}$ of imaging media 32 increases more rapidly after the temperature of imaging media 32 drops below its glass transition temperature Tg.

In light of the above, in one embodiment, as will be described in further detail below, cooling section 36 is configured such that the heat transfer rate of cooling section 36 varies along transport path 46 so as to provide $T_{GRD}$ 70 in imaging media 32 at a level substantially equal to and not exceeding $T_{GRD}^{max}$ of imaging media 32. In one embodiment, cooling section 36 is configured to provide TGRD 70 in imaging media 32 substantially at $T_{GRD}^{max}$ at least until imaging media 32 cools to its associated Tg. It should be noted that a maximum heat transfer rate of cooling section 36, without exceeding $T_{GRD}^{max}$ depends on a transport rate of imaging media 32 by transport system 52. The faster the transport rate, the higher the rate of heat transfer of cooling section 36 can be without exceeding $T_{GRD}^{max}$ of imaging media 32.

By varying the heat transfer rate along transport path 46 as the temperature of imaging media 32 decreases so as to substantially match $T_{GRD}$ 70 to $T_{GRD}^{max}$, cooling section 36 is able to substantially minimize a time necessary to cool imaging media 32 from a development temperature to a desired exit temperature without introducing visual and physical artifacts resulting from wrinkling of the base material. As a result, the "throughput" of thermal processor 30 is increased while maintaining a small physical footprint.

Figure 4:
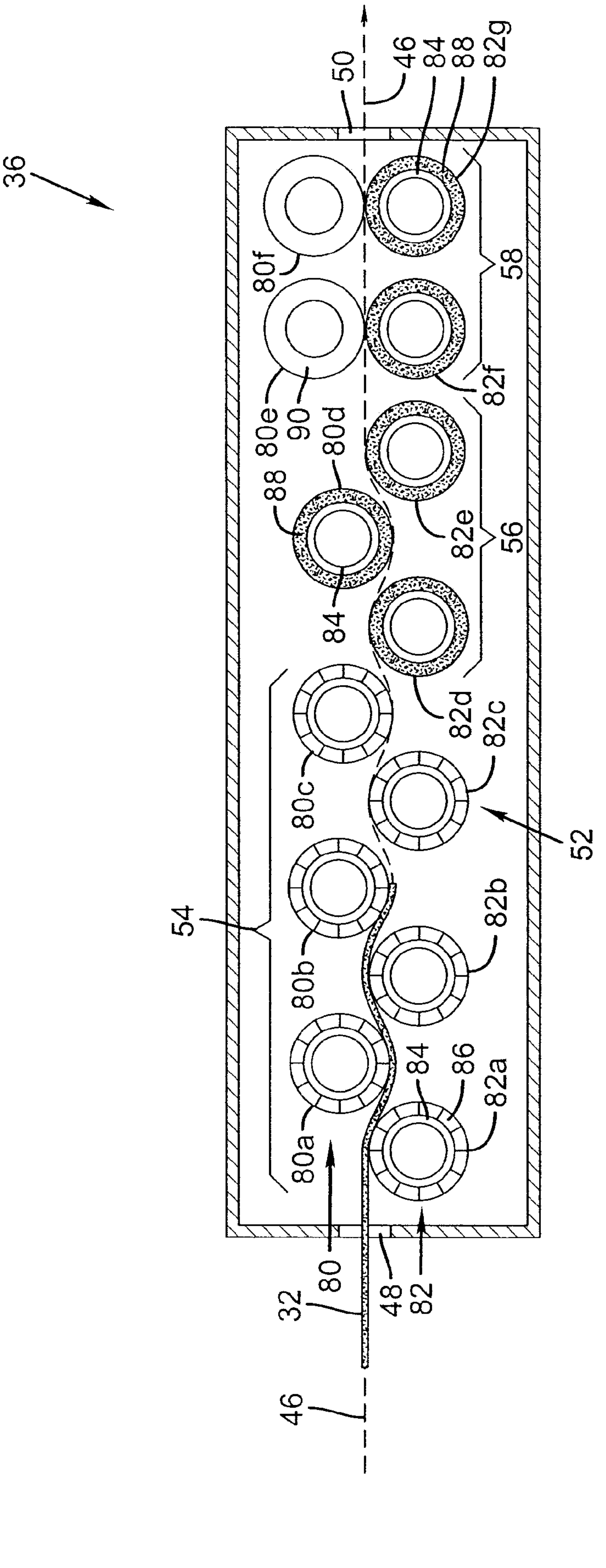
FIG. 4 is a cross-sectional view of one embodiment of a cooling section according to the present invention.

FIG. 4 is a cross-sectional view of an example embodiment of cooling section 36 according to the present invention for cooling imaging media 32. Transport system 52 includes a plurality of upper rollers 80 and a plurality of lower rollers 82 rotatably mounted between opposing sides of cooling section 36 and positioned in a spaced relationship so as to form transport path 46 through cooling section 36. One or more of the upper and lower rollers 80, 82 is driven such that contact between upper and lower rollers 80 and 82 moves imaging media 32 through cooling section 36 along transport path 46 from entrance 48 to exit 50.

A portion of upper rollers 80, illustrated as rollers 80*a* through 80*c*, and a portion of lower rollers, illustrated as rollers 82*a* through 82*c*, form first zone 54 of cooling section 36. Rollers 80*a* through 80*c* and rollers 82*a* through 82*c* of first zone 54 include a cylindrical shaft 84 covered with sleeves of a first support material 86. A portion of upper rollers 80, illustrated as roller 80*d*, and a portion of lower rollers 82, illustrated as rollers 82*d* and 82*e*, form second zone 56 of cooling section 36. Rollers 80*d*, 82*d*, and 82*e* include cylindrical shaft 84 covered with sleeves of a second support material 88. A portion of upper rollers 80, illustrated as rollers 80*e* and 80*f*, and a portion of lower rollers 82, illustrated as rollers 82*f* and 82*g*, from third zone 58 of cooling section 36. Rollers 82*f* and 82*g* include cylindrical shaft 84 covered with sleeves of second support material 88, with rollers 80*e* and 80*f* including a cylindrical shaft 90 having no support material.

In one embodiment, first support material 86 has a first thermal conductivity, second support material 88 has a second thermal conductivity, and cylindrical shaft 90 has a third thermal conductivity. In one embodiment, the third thermal conductivity is greater than the second thermal conductivity, and the second thermal conductivity is greater than the first thermal conductivity. As such, in one embodiment, third zone 58 has a higher thermal conductivity than second zone 56, and second zone 56 has a higher thermal conductivity than first zone 54. In one embodiment, first support material 86 comprises foamed silicon rubber. In one embodiment, first support material 86 comprises foamed silicon having a density of 34+/−6 pounds per cubic foot and a hardness of 40 (Asker® Type C). In one embodiment, second support material 88 comprises solid silicon rubber having a hardness of 62+/−5 (Shore® "A").

In one embodiment, cylindrical shafts 84 and 90 are metallic. In one embodiment, cylindrical shafts 84 and 90 comprise extruded aluminum. In one embodiment, as illustrated by roller 80*a* in FIG. 5, cylindrical shafts 84 (and cylindrical shaft 90) comprise hollow extruded aluminum shafts having internal fins 92 to improve the transfer of heat from cylindrical shafts 84.

Figure 6:
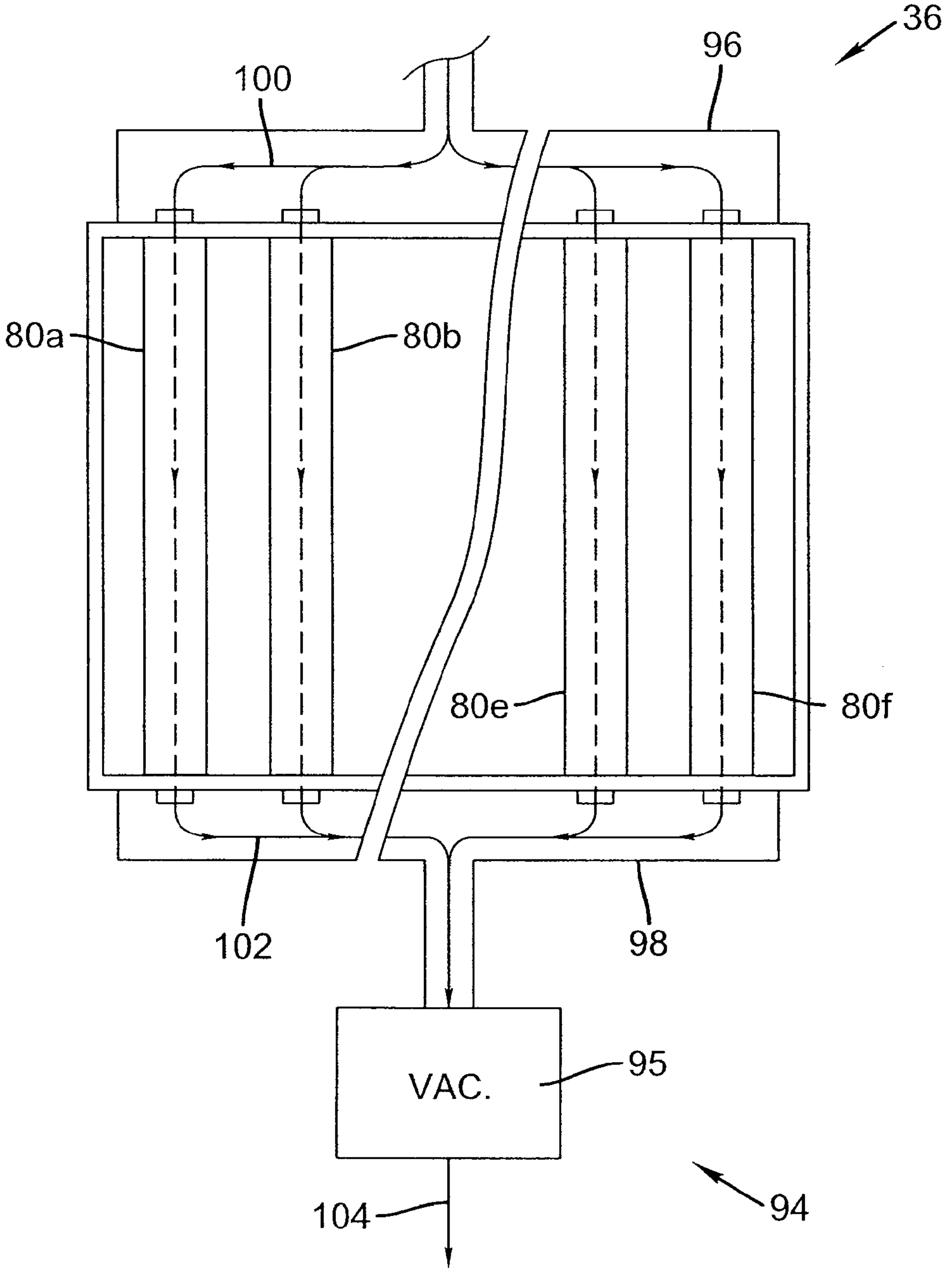
FIG. 6 is a top view illustrating portions of one embodiment of a cooling section according to the present invention.

In one embodiment, as illustrated generally by a top view of portions of cooling section 36 in FIG. 6, cooling section 36 further includes a vacuum system 94 to transfer heat from upper and lower rollers 80, 82. Vacuum system 94 includes a vacuum 95, an intake manifold 96 coupled across first ends of upper and lower rollers 80, 82, and an exhaust manifold 98 coupled across second ends of upper and lower rollers 80, 82. Vacuum 95 draws "cool" air flows 100 (air at an ambient temperature and chilled air, for example) from intake manifold 96 through hollow cylindrical shafts 84, 90 and past fins 92 of upper and lower rollers 80, 82. Cool air flows 100 absorb heat from upper and lower rollers 80, 82 and form heated air flows 102 which are subsequently exhausted from exhaust manifold 98, as indicated at 104.

In operation, with reference to FIG. 4, cooling section 36 receives imaging media 32 at entrance 48 from oven 34 substantially at the desired development temperature ($T_D$). Through contact with imaging media 32, upper and lower rollers 80 and 82 of transport system 52 move imaging media 32 through cooling section 36 along transport path 46 from entrance 48 to exit 50 at a desired transport rate. As imaging media 32 moves along transport path 46, upper and lower rollers 80, 82 absorb heat from imaging media 32 such that it leaves cooling section 36 at exit 50 substantially at a desired exit temperature ($T_E$). In one embodiment, the development temperature is substantially equal to 125° C. In one embodiment, the desired exit temperature is approximately equal to 50° C.

As described above, imaging media 32 has an associated glass transition temperature, Tg, and a maximum cooling temperature gradient $T_{GRD}^{max}$ which, if exceeded, may cause wrinkles in imaging media 32. In one embodiment, Tg is approximately 70° C. In one embodiment, Tg is approximately at the center of a glass transition temperature range. In one embodiment, the glass transition temperature range is from approximately 55° C. to 80° C. In one embodiment, the glass transition temperature is greater than the desired exit temperature, but below the development temperature (i.e., $T_E<Tg<T_D$).

As imaging media 32 moves along transport path 46, it is initially engaged by rollers 80*a* through 80*c* and 82*a* through 82*c* of first zone 54 which begin to absorb heat from and cool imaging media 32. The rate of heat transfer can be described by the following Equation I:

$$q=(\Delta T)(k)(c) \qquad \text{(Equation I)}$$

where:

q=rate of heat transfer;

ΔT=heat differential between imaging media 32 and cooling section 36;

k=thermal conductivity of roller; and c=constant based on physical dimensions of imaging media 32 (e.g. surface area, thickness).

Because imaging media 32 enters first zone 54 substantially at $T_D$, the heat differential, ΔT, between imaging media 32 and cooling section 36 is at its greatest in first zone 54.

As such, the thermal conductivity (k) of rollers 80*a* through 80*c* and 82*a* through 82*c* and, thus, the thermal conductivity of first support material 86, is selected so as to be smaller relative to rollers 80*d*, 82*d*, and 82*e* of second zone 56 and rollers 80*e*-80*f* and 82*f*-82*g* of third zone 58. In one embodiment, the thermal conductivity (k) of first support material is selected so that the rate of heat transfer (q) from imaging media 32 when moving at the desired transport rate is such $T_{GRD}$ 70 formed across imaging media 32 by first zone 54 is substantially equal to and not exceeding $T_{GRD}^{max}$ associated with imaging media 32. In one embodiment, as described above, first support material 86 comprises foamed silicon.

However, as imaging media 32 moves through and is cooled by first zone 54, the ΔT between imaging media 32 and first zone 56 begins to decrease. In one embodiment, as imaging media passes from roller 80*c* of first zone 54 to roller 82*d* of second zone 56, the temperature of imaging media 32 is below $T_D$, but above Tg. As a result of the decreased temperature, a level of ($T_{GRD}$) 70 formed across imaging media 32 begins to drop increasingly below $T_{GRD}^{max}$ (see FIG. 3) as imaging media moves through first zone 54, leading to a decrease in the rate of cooling of the media.

As such, to increase the rate of heat transfer (q) from imaging media 32 and thereby increase the level of $T_{GRD}$ 70 formed across imaging media 32 such that it is again substantially equal to but not exceeding $T_{GRD}^{max}$, the thermal conductivity (k) of second support material 88 of rollers 80*d* and 82*d*-82*e* is selected so as to be greater than that of first support material 86. In one embodiment, as described above, second support material 86 comprises a solid silicon rubber.

However, as second zone 56 continues to cool imaging media 32, the ΔT between imaging media 32 cooling section 36 again begins to decrease. In one embodiment, as imaging media 32 passes from roller 82*e* of second zone 56 to rollers 80*e* and 82*f* of third zone 58, the temperature of imaging media 32 has cooled so as to be further below $T_D$, but remains above Tg. As a result, a level of $T_{GRD}$ 70 across imaging media 32 again begins to fall increasingly below $T_{GRD}^{max}$ (see FIG. 3) as imaging media 32 nears third section 58.

As such, to again increase the rate of heat transfer (q) from imaging media 32, the thermal conductivity (k) of rollers 80*e*-80*f* and 82*f*-82*g* of third zone 58 is increased relative to that of rollers 80*d* and 82*d*-82*e* of second zone 56 and selected so as to increase $T_{GRD}$ 70 formed across imaging media 32 such that it is again substantially equal to but not exceeding $T_{GRD}^{max}$. In one embodiment, as illustrated, lower rollers 82*f*-82*g* continue to employ second support material 88 while upper rollers 80*e*-80*f* comprise bare aluminum having a higher thermal conductivity (k) than second support material 88. As imaging media 32 passes through third zone 56, the temperature drops below Tg and continues to cool until exiting cooling section 36 at a temperature substantially equal to $T_E$.

In one embodiment, as illustrated by FIG. 4, upper rollers 80*a* through 80*d* and lower rollers 82*a* through 82*e* of first and second zones 54 and 56 are horizontally offset and vertically positioned so as to overlap a horizontal plane such that transport path 46 through first and second zones 54 and 56 is corrugated in shape. Positioning the upper and lower rollers 80*a* through 80*d* and 82*a* through 82*e* to form such a corrugated path causes imaging media 32 to bend as it moves along transport path 46 through first and second cooling sections 54 and 56. Bending imaging media 32 in this fashion increases the column stiffness of imaging media 32 and enables it to be moved along transport path 46 without a need for nip rollers. Nip rollers "pinch" the imaging media and can cause defects in the emulsion through contact with the rollers, thereby leading to image artifacts, particularly when the emulsion is at a high enough temperature that it is still processing. Nip rollers also restrict movement of the imaging media which can cause wrinkling of the imaging media as it contracts during the cooling process, particularly when the imaging media is at a temperature above an associated glass transition temperature.

By offsetting upper and lower rollers 80*a* through 80*d* and 82*a* through 82*e* of first and second zones 54, 56 to form a corrugated transport path 46, cooling section 36 enables imaging media 32 (e.g. the polymer base material) to more freely contract, particularly when the temperature differential (ΔT) is greatest (e.g. in first and second zones 54 and 56), thereby reducing the potential for wrinkling. Additionally, by adding beam strength through the bending of imaging media 32 by corrugated transport path 46, $T_{GRD}^{max}$ of imaging media 32 is effectively increased, thereby enabling cooling section 36 to transfer heat at a higher rate without causing wrinkling of the polymer base material.

In one embodiment, as illustrated by FIG. 4, upper rollers 80*e*, 80*f* and lower rollers 82*f*, 82*e* of third zone 58 are configured to form a pair of nips. In addition to employing "bare" aluminum rollers 80*e* and 80*f* to increase the heat transfer rate, utilizing a nip configuration further increases the heat transfer rate of third zone 58. Furthermore, in one embodiment, as will be described in further detail below, imaging media 32 first reaches and then falls below its glass transition temperature as it moves through third zone 58. Employing nips substantially reduces the potential for setting or freezing curls in developed imaging media 32 as drops below the glass transition temperature and exits cooling section 36.

Figure 7:
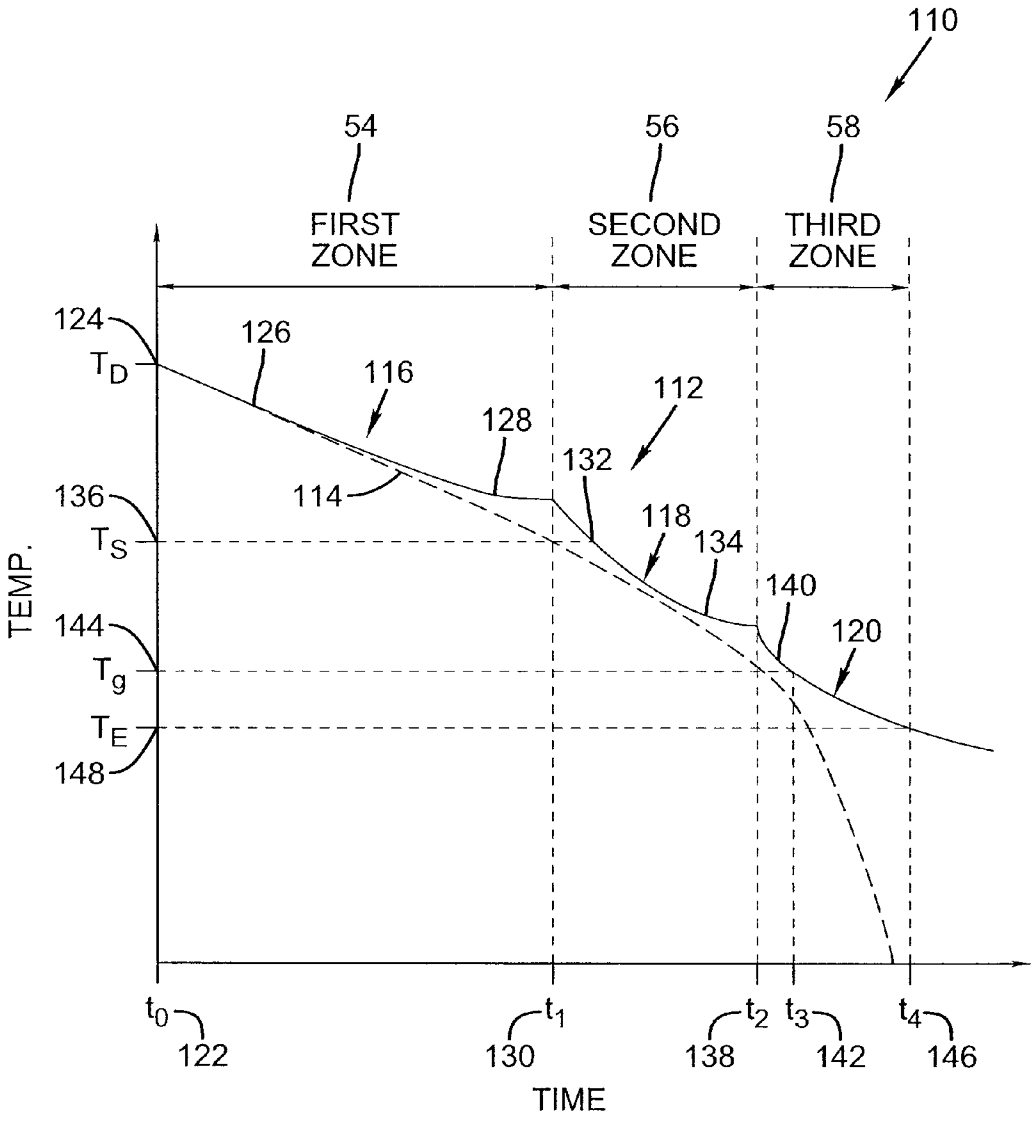
FIG. 7 is a graph of an example temperature curve illustrating the operation of one embodiment of a cooling section according to the present invention.

FIG. 7 is a graph 110 of an example temperature curve 112 illustrating generally the temperature of imaging media 32 as it travels at a given transport rate through cooling section 36 as illustrated by FIG. 4. The temperature of imaging media 32 is illustrated along the y-axis and time is illustrated along the x-axis. An optimal temperature curve 114 (illustrated with a dashed line) represents a maximum cooling rate of imaging media 32 at the given transport rate and when above its associated glass transition temperature, which would result in imaging media 32 being sustained and cooled substantially at the maximum cooling temperature gradient.

Graph 110 illustrates waveform 112 as having three segments 116, 118, and 120. Segment 116 illustrates the temperature of imaging media 32 as it travels through first zone 54, segment 118 as it travels through second zone 56, and segment 120 as it travels through third zone 58. With reference to segment 116, at time $t_0$, as indicated at 122, imaging media 32 enters first zone 54 of cooling section 36 at a temperature substantially equal to the development temperature ($T_D$), as indicated at 124. Initially, as imaging media 32 travels through first zone 54 and begins to cool, the rate of temperature drop approximately follows the optimal temperature curve 114, as indicated at 126. However, as imaging media 32 continues to cool as it moves through first zone 54, the temperature differential (ΔT) between imaging media 32 and cooling section 36 begins to decrease causing the rate of temperature drop to decrease and temperature curve 112 to increasingly deviate from optimal temperature curve 114, as indicated at 128.

At time $t_1$, as indicated at 130, imaging media 32 passes to second zone 56, which has a higher thermal conductivity than first zone 54. As a result, the rate of temperature drop of imaging media 32 increases, and temperature curve 114 again begins to approach optimal temperature curve 114, as indicated at 132. However, as imaging media 32 continues cool as it moves through second zone 56, the temperature differential (ΔT) between imaging media 32 and cooling section 36 begins to decrease causing the rate of temperature drop to decrease and temperature curve 112 to again increasingly deviate from optimal temperature curve 114, as indicated at 134. In the example of FIG. 4, as imaging media 32 moves through second zone 56, its temperature drops below an emulsion temperature, $T_S$, as indicated at 136, at which point a chemical reaction of the emulsion ceases.

At time $t_2$, as indicated at 138, imaging media 32 passes to third zone 58, which has a higher thermal conductivity than second zone 56. As a result, the rate of temperature drop of imaging media 32 again increases, and temperature curve 114 again begins to approach optimal temperature curve 114, as indicated at 140. At time t3, as indicated at 142, the temperature of imaging media 32 reaches its glass transition temperature, as indicated at 144. After reaching its glass transition temperature, imaging media 32 continues to cool as it moves through third zone 58 until at time t4, as indicated at 146, it reaches the desired exit temperature ($T_E$), as indicated at 148, which corresponds to exit 50 of cooling section 36 (see FIG. 4). It is noted that once the temperature of imaging media 32 reaches its glass transition temperature at $t_3$ 142, the rate of temperature drop of imaging media 32 may exceed that indicated by optimal temperature curve 114.

Although described above primarily in terms of varying the thermal conductivity (k) of the rollers, in view of Equation I, the rate of heat transfer (q) is also based on the temperature differential (ΔT) between imaging media 32 and cooling section 36. As such, in one embodiment, a temperature of cooling section 36 is decreased along transport path 45 so as to adjust the temperature differential (ΔT) between imaging media 32 and cooling section 36 and maintain $T_{GRD}$ 70 at a level substantially equal to, but not exceeding, $T_{GRD}^{max}$ associated with imaging media 32.

Figure 5:
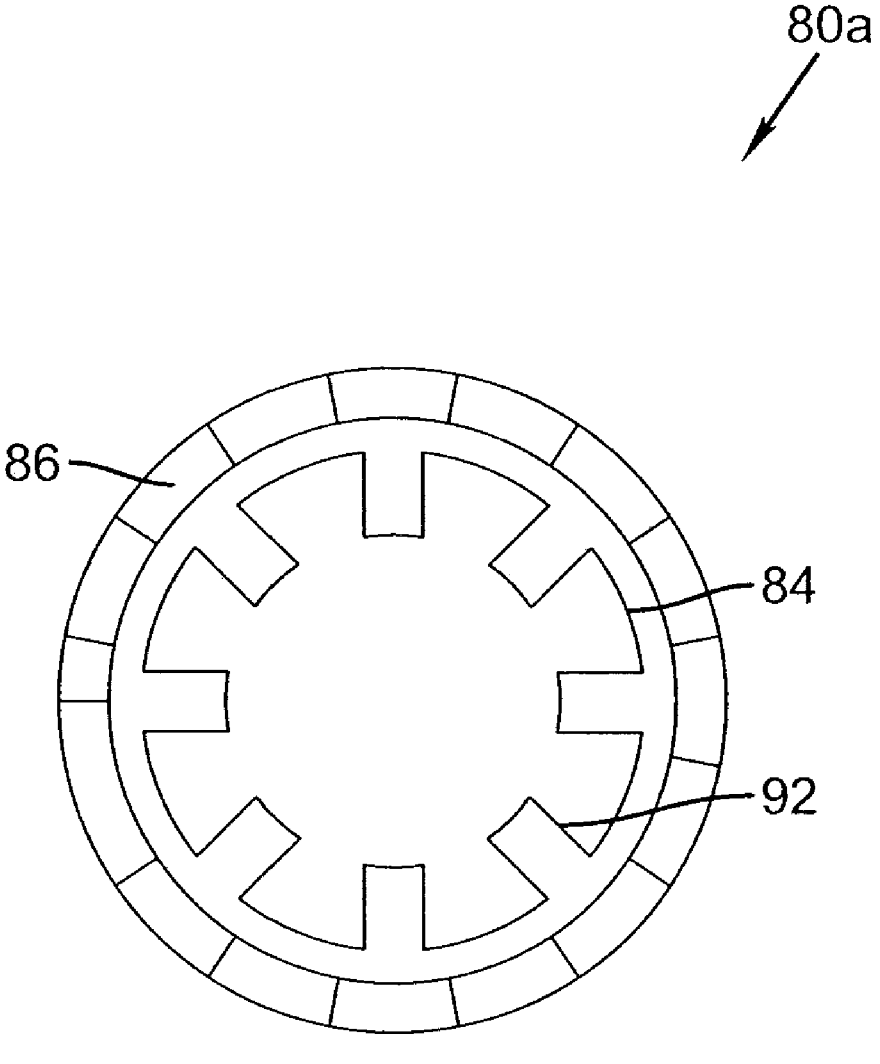
FIG. 5 is a cross-sectional view of one embodiment of a roller according to the present invention.
Figure 8:
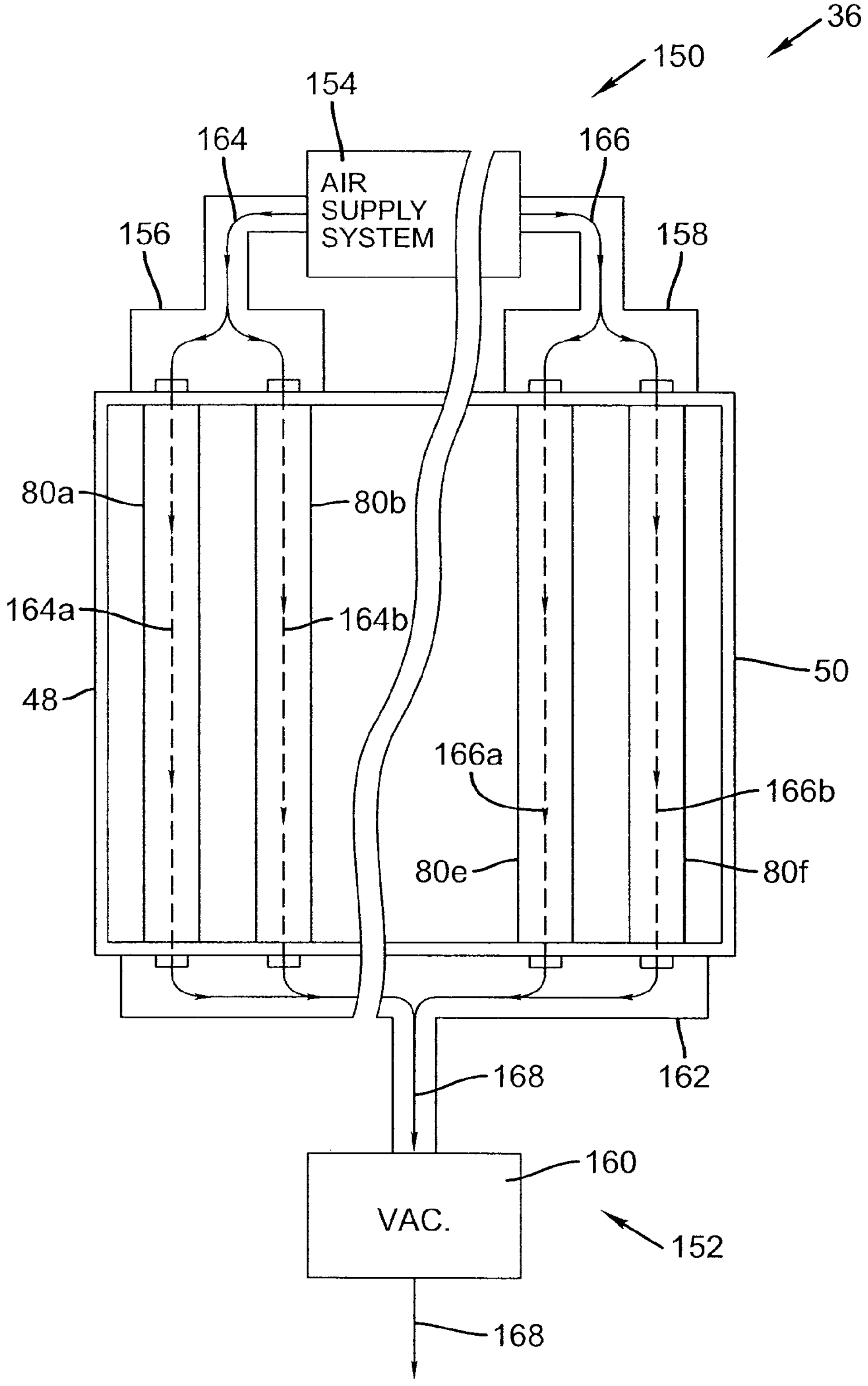
FIG. 8 is a block and schematic diagram illustrating portions of one embodiment of a cooling section in accordance with the present invention.

FIG. 8, with further reference to FIGS. 4-6, is a top view illustrating generally portions of one embodiment of cooling section 36 configured to vary (e.g. decrease) the temperature of upper and lower rollers 80 and 82 along transport 46 from entrance 48 to exit 50. Cooling section 36 includes an air supply system 150 and a vacuum system 152. Air supply system 150 includes an air supplier 154 coupled across first ends of a first portion of upper and lower rollers 80, 82 (e.g. rollers 80*a* and 80*b* as illustrated) via a first supply manifold 156, and across first ends of a second portion of upper and lower rollers 80, 82 (e.g. rollers 80*e* and 80*f* as illustrated) via a second supply manifold 158. Vacuum system 152 includes a vacuum 160 coupled across second ends of upper and lower rollers 80, 82 via an exhaust manifold 162.

In one embodiment, as illustrated by FIG. 8, air supplier 154 provides a first air flow 164 at a first temperature $T_a$ to rollers 80*a* and 80*b* via first supply manifold 156, and a second air flow 166 at a second temperature $T_b$ to rollers 80*e* and 80*f* via second supply manifold 158. In one embodiment, second temperature $T_b$ is less than first temperature $T_a$. First and second air flows 164 and 166 are respectively split into air flows 164*a*, 164*b* and air flows 166*a*, 166*b*, and respectively drawn through rollers 80*a*, 80*b*, 80*e* and 80*f* to exhaust manifold 162 by vacuum 160. Air flows 164*a*, 164*b*, 166*a* and 166*b* combine to form single exhaust air flow 168.

Although illustrated by FIG. 8 as providing only first and second air flows 164 and 166, in other embodiments, air supply system 150 provides more than two air flows, with each air flow having a different temperature. For example, in one embodiment, air supply system 150 is configured to provide a separate air flow to each of the upper and lower rollers 80, 82, with each air flow having a different temperature.

In one embodiment, the temperatures of the air flows provided to upper and lower rollers 80, 82 (e.g. air flows 164, 166) decreases along transport path 46 from entrance 48 to exit 50 in order to adjust the temperature differential (ΔT) between cooling section 36 and imaging media 32 as it cools so as to achieve a desired rate of heat transfer (q) from imaging media 32 to cooling section 36. In one embodiment, the temperatures of the air flows and, thus, the temperatures of upper and lower rollers 80, 82, are decreased from entrance 48 to exit 50 so that heat is transferred (i.e. absorbed) from imaging media 32 as required to create and maintain $T_{GRD}$ 70 substantially equal to but not exceeding $T_{GRD}^{max}$ of imaging media 32.

As such, with reference to FIG. 7, a cooling temperature curve for imaging media 32 similar to temperature curve 112 is achieved by varying (e.g. decreasing) the temperatures of upper and lower rollers 80, 82. In one embodiment, when varying the temperature of the rollers, upper and lower rollers 80, 82 having a same thermal conductivity (k). Additionally, it is noted that the techniques of varying the thermal conductivity of the rollers and varying the temperatures of the rollers may be employed separately or in combination with one another.

The invention has been described in detail with particular reference to certain preferred embodiments thereof, but it will be understood that variations and modifications can be effected within the spirit and scope of the invention.

PARTS LIST

30 Thermal Processor
32 Imaging Media
34 Oven
36 Cooling Section
38 Oven Entrance
40 Oven Exit
42 Oven Transport System
44 Heating System
46 Transport Path
48 Cooling Section Entrance
50 Cooling Section Exit
52 Cooling Section Transport System
54 Cooling Section—First Zone
56 Cooling Section—Second Zone
58 Cooling Section—Third Zone
60 Directional Arrow
62 Imaging Media—Leading Portion
64 Imaging Media—Trailing Portion
66 Imaging Media—Transition Portion
68 Transition Portion Length
70 Temperature Gradient
72 Leading Portion—Width
74 Trailing Portion—Width
76 Imaging Media—Wrinkles
78 Graph
79 Maximum Cooling Temperature Gradient Curve
80 Upper Rollers (i.e. 80*a* through 80*f*)
82 Lower Rollers (i.e. 82*a* through 82*g*)
84 Roller—Cylindrical Shaft
86 First Support Material
88 Second Support Material
90 Roller—Cylindrical Shaft (w/o support material)
92 Roller—Internal Fins
94 Vacuum System
95 Vacuum
96 Intake Manifold
98 Exhaust Manifold
100 Cool Air Flows
102 Heated Air Flows
104 Exhaust Air Flow
110 Graph
112 Temperature Curve
114 Optimal Temperature Curve
116 Temperature Curve Segment
118 Temperature Curve Segment
120 Temperature Curve Segment
122 Time "$t_0$"
124 Development Temperature "$T_D$"
126 Temperature Curve Position
128 Temperature Curve Position
130 Time "$t_1$"
132 Temperature Curve Position
134 Temperature Curve Position
136 Emulsion Temperature "$T_S$"
138 Time "$t_2$"
140 Temperature Curve Position
142 Time "$t_3$"

144 Glass Transition Temperature "Tg"
146 Time "$t_4$"
148 Exit Temperature "$T_E$"
150 Air Supply System
152 Vacuum System
154 Air Supplier
156 First Supply Manifold
158 Second Supply Manifold
160 Vacuum
162 Exhaust Manifold
164 First Air Flow
**164*a*, 164*b*** Split First Air Flows
166 Second Air Flow
**166*a*, 166*b*** Split Second Air Flows
168 Exhaust Air Flow

What is claimed is:

1. A cooling section suitable for use with a thermal processor, the cooling section comprising:

an entrance;

an exit; and a plurality of rollers positioned to form a transport path from the entrance to the exit and, through contact with the imaging media, configured to move the imaging media through the cooling section along the transport path, wherein the rollers are configured to absorb heat from the imaging media to cool the imaging media from a development temperature to a desired exit temperature as the imaging media moves along the transport path from the entrance to the exit, and wherein a thermal conductivity of the rollers increases along the transport path from the entrance to the exit to vary the heat transfer rate.

2. The cooling section of claim 1, wherein the thermal conductivity of the rollers increases along the transport path so as to provide a varying rate of heat transfer from the imaging media to create a varying cooling temperature gradient in the imaging media substantially equal to and not exceeding a varying maximum cooling temperature gradient of the imaging media.

3. The cooling section of claim 2, wherein the varying cooling temperature gradient is substantially equal to and not exceeding the varying maximum cooling temperature gradient at least until the imaging media cools to a glass transition temperature.

4. The cooling section of claim 1, wherein the plurality of rollers includes a first plurality of rollers having a first thermal conductivity positioned adjacent to the entrance, a second plurality of rollers having a second thermal conductivity positioned adjacent to and downstream of the first plurality of rollers along the transport path, and a third plurality of rollers having a third thermal conductivity positioned between the exit and the second plurality of rollers.

5. The cooling section of claim 4, wherein the first plurality and second plurality of rollers are positioned so as to form the transport path with a corrugated shape.

6. The cooling section of claim 4, wherein the third plurality includes as least one pair of rollers positioned to form a nip.

7. The cooling section of claim 4, wherein the rollers of the first plurality of rollers each comprise a shaft having an outer sleeve of foamed silicon rubber.

8. The cooling section of claim 4, wherein the rollers of the second plurality of rollers each comprises a shaft having an outer sleeve of solid silicon rubber.

9. The cooling section of claim 6, wherein a first roller of the pair comprises a shaft having an outer sleeve of silicon rubber and a second roller of the pair comprises only a rotatable shaft.

10. The cooling section of claim 9, wherein the rotatable shaft of the second roller comprises aluminum.

11. The cooling section of claim 1, wherein up to all of the rollers are hollow, and wherein the cooling section further includes a forced air system configured to move a cooling air flow through the hollow rollers.

12. A method of cooling an imaging media, the method comprising:

receiving a heated imaging media;

providing a varying rate of heat transfer from the imaging media by moving the heated imaging media across a plurality of surfaces of increasing thermal conductivity to create a varying cooling temperature gradient substantially equal to and not exceeding a varying maximum cooling temperature gradient of the imaging media.

13. The method of claim 12, wherein providing the varying rate of heat transfer including moving the heating imaging media across a plurality of surfaces of decreasing temperature.

14. The method of claim 12, further including bending the imaging media to increase the beam strength of the imaging media so as to increase the maximum cooling temperature gradient.

* * * * *